Figure 1:
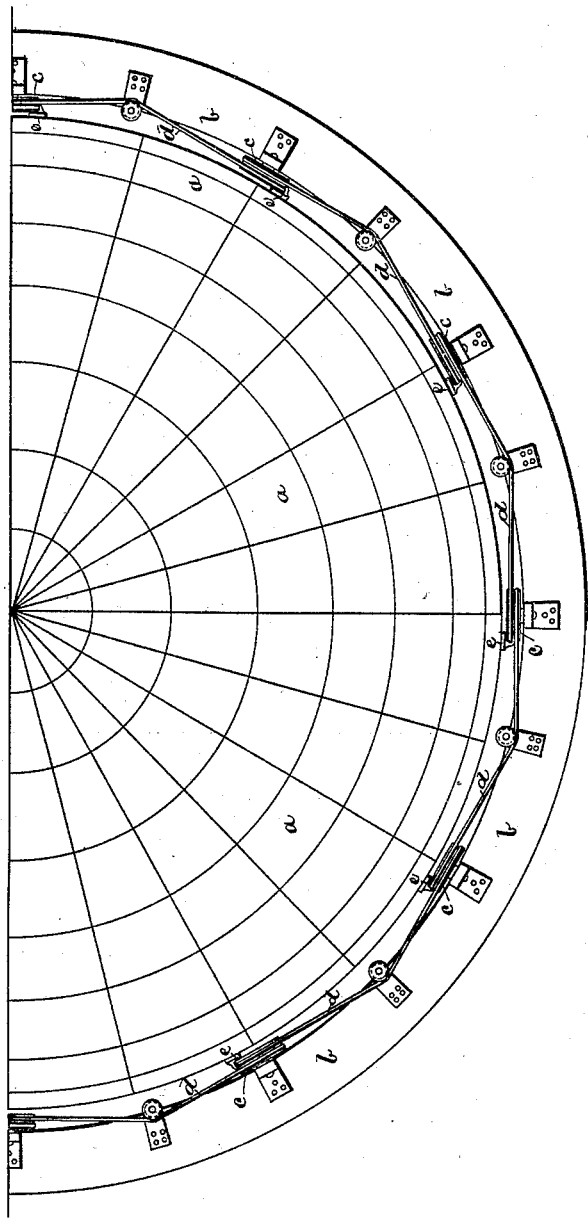

(No Model.) 6 Sheets—Sheet 1.

W. GADD.
GAS HOLDER.

No. 433,463. Patented Aug. 5, 1890.

Witnesses:
George Frederick Gadd.
John Groves Ward

Inventor:
William Gadd.

(No Model.)  
6 Sheets—Sheet 3.

W. GADD.
GAS HOLDER.

No. 433,463.  
Patented Aug. 5, 1890.

Witnesses:  
George Frederick Gadd.  
John Groves Ward

Inventor:  
William Gadd (No Model.) 6 Sheets—Sheet 4.
W. GADD.
GAS HOLDER.

No. 433,463. Patented Aug. 5, 1890.

Witnesses:
George Frederick Gadd.
John Groves Ward

Inventor:
William Gadd.

(No Model.) 6 Sheets—Sheet 5.
W. GADD.
GAS HOLDER.

No. 433,463. Patented Aug. 5, 1890.

Witnesses:
George Frederick Gadd.
John Groves Ward

Inventor:
William Gadd.

(No Model.)   6 Sheets—Sheet 6.

W. GADD.
GAS HOLDER.

No. 433,463.   Patented Aug. 5, 1890.

Witnesses:
George Frederick Gadd.
John Groves Ward

Inventor:
William Gadd

UNITED STATES PATENT OFFICE.

WILLIAM GADD, OF MANCHESTER, ENGLAND.

GAS-HOLDER.

SPECIFICATION forming part of Letters Patent No. 433,463, dated August 5, 1890.

Application filed August 21, 1889. Serial No. 321,559. (No model.) Patented in England December 12, 1888, No. 18,119.

*To all whom it may concern:*

Be it known that I, WILLIAM GADD, a subject of the Queen of Great Britain, residing at the city of Manchester, England, have invented new and useful Improvements in Gas-Holders, (for which I have obtained provisional protection in Great Britain, No. 18,119, bearing date December 12, 1888,) of which the following is a specification.

The improvement relates to the construction of gas-holders, and has for its object the supporting of the same in their working position in such manner as to enable the external or upper guide-framing, hitherto employed for that purpose, to be dispensed with and yet to give the requisite stability, although such or a modified form of framing may be employed in connection with the improvements herein described when desired. To accomplish this and to effect my improvements, I fix round the face of the tank or well a series of vertical guides which are constructed in the form of vertical endless chains or bands passing over and between pulleys or wheels turning on studs fixed at or near the top and the bottom of the tank. At corresponding intervals round the lower curb or ring of the holder I mount suitable studs, projections, or brackets, which are attached to the endless chains or bands aforesaid. These wheels are by preference likewise geared together by separate or continuous chains or bands or otherwise in such manner that when one is caused to turn the whole will turn therewith and to the same extent. By which means if the holder connected with these chain or rope gear and wheels moves upward or downward it will be sustained in the same relative position at all heights. The like result is also obtained by fixing the vertical chains or bands, as aforesaid, to the outer face of the holder and the brackets or projections round the top of the tank, and in like manner the method may be extended to telescopic holders. The wheels which carry the guides may be geared together, either by shafts intermediate between and turning in suitable journals, or by means of intermediate wheels in train, or by plain chain or rope, or link-chain gearing, separate or continuous, and instead of the whole being geared together portions thereof may be geared as a modification.

Other variations in detail may be made without departing from the peculiar character of the invention, which consists in connecting, by means of tensional gearing, a number of points round the bottom curb of a gas-holder in such manner that when one point thereof tends to rise or fall the same tendency is transmitted through such gearing round the circle to every other point; but that the invention may be better understood I will, by aid of the accompanying drawings, proceed more fully to describe means employed by me.

Figure 2:
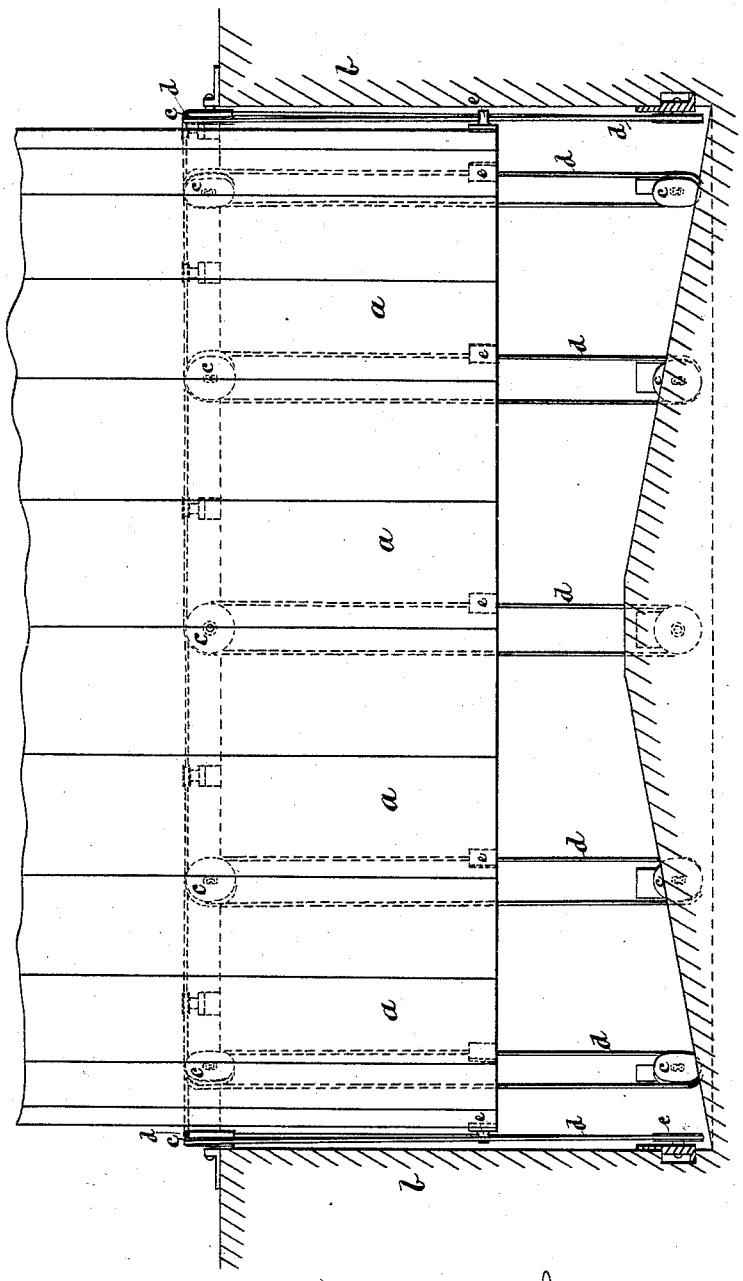
Figure 3:
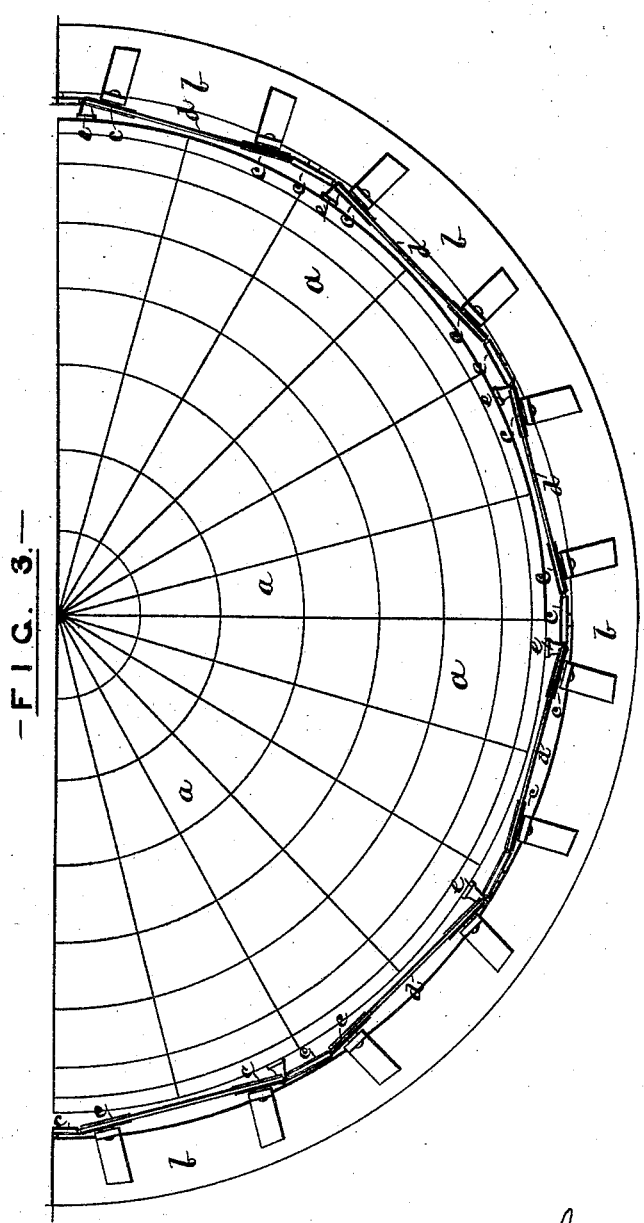
Figure 4:
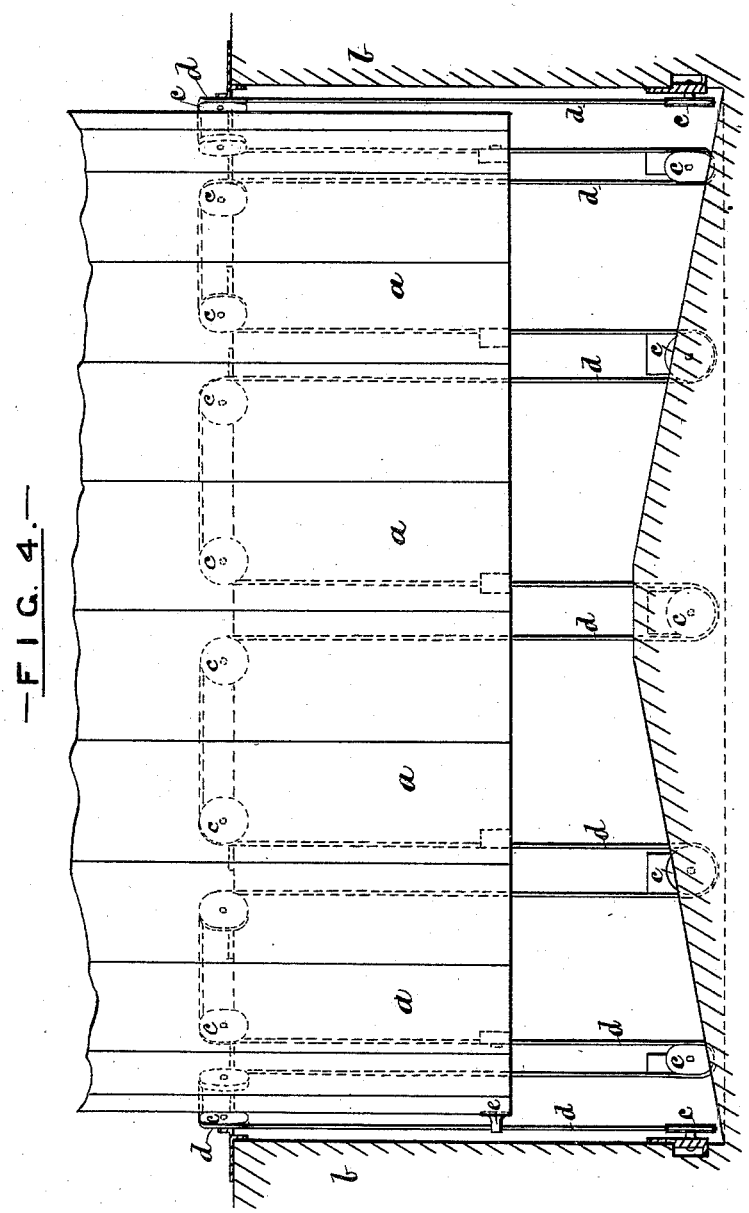
Figure 5:
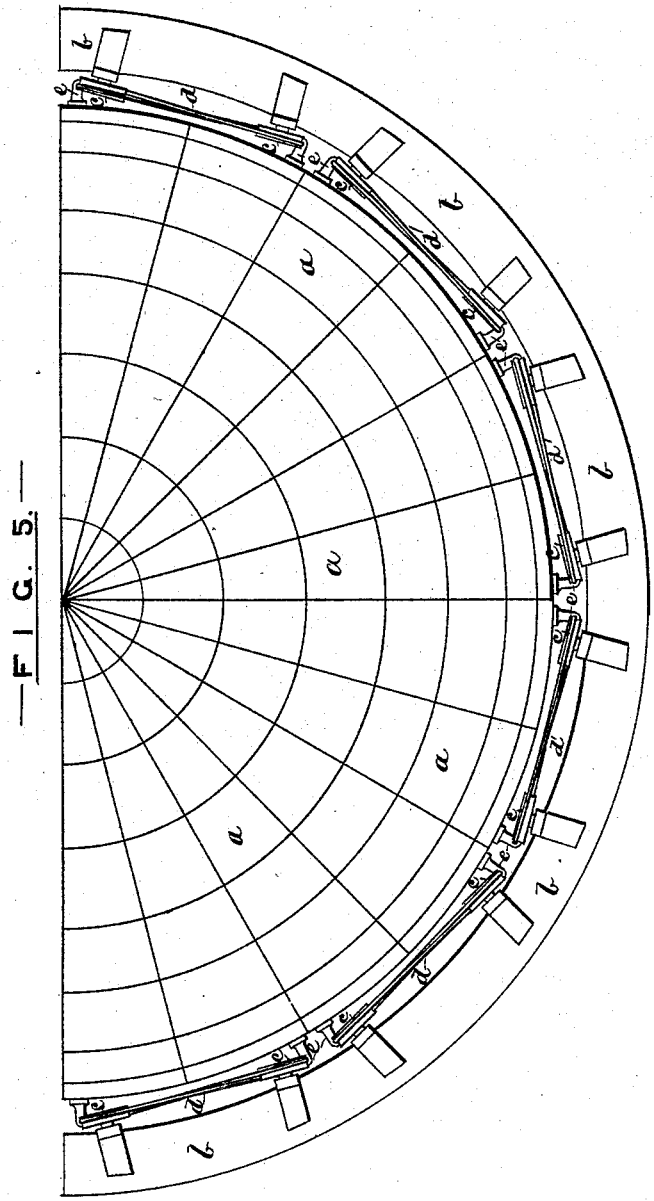
Figure 6:
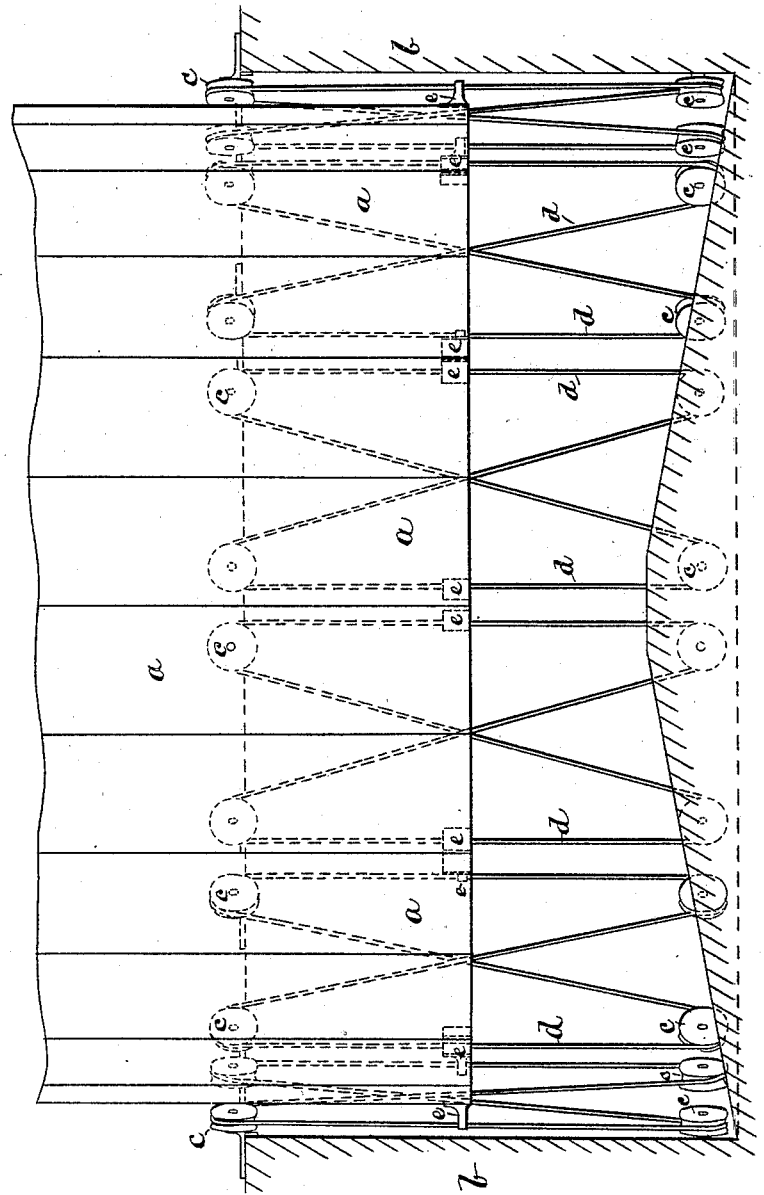

In the drawings, Figure 1 shows a plan view, and Fig. 2 a sectional elevation, of one arrangement of the improvements applied by means of continuous chain or wire or other rope gearing attached to the tank-wall. Fig. 3 shows a plan view, and Fig. 4 a sectional elevation, of another form of the same application attached to the tank-wall, while Fig. 5 shows a plan view, and Fig. 6 a sectional elevation, of a form of tensional gearing employing separate or non-continuous chains or bands.

The wheels carrying vertical chain or rope gearing may also be connected by separate chain-gearing, by tangential pinions or angular-geared wheels, by torsional gearing, or by a train of tangential wheels geared together round the holder. The examples of modes of applying chain or tension gearing may be link chain, plain chain, or wire rope in accordance with my improvement. Examples of gearing by means of plain chain or wire or other rope gearing with plain wheels or pulleys are shown; but combinations of two or more varieties of gearing may be employed.

The same letters indicate corresponding parts wherever they occur.

$a\,a$ is the holder or the bottom curb thereof, and $b\,b$ the tank side or wall.

$c\,c$ are the wheels, over and under which the flexible guides or bands pass, and $d\,d$ are the ropes or chains or bands forming such flexible guides.

When the plain chain or rope gearing is attached to the holder, the vertical chain or chains is or are attached at suitable points, as at $e\,e$, to the tank-side, while if the chain or rope gearing is attached to the tank-wall the chain or chains is or are attached at suitable points, as at *e e*, to the bottom curb of the holder. Suitable devices for tightening the tension gearing may be employed by raising or lowering the wheels, or some of them, as will be readily understood, and which are not necessary to be shown. In the examples illustrated by Figs. 1, 2, 3, and 4, the band forming the guides *d d* is composed of one endless rope or chain continuous round the circle of the tank, while in that illustrated by Figs. 5 and 6 separate endless bands are employed, each passing round four wheels and joined together into a system of gearing by the attachments to the holder at *e e*.

It will be obvious that other varieties of arrangements of tensional gearing may be employed, and combinations thereof with other gearing, which, like those shown, are mechanical equivalents of each other, the object and operation of all of them being to gear the different actuating-points round the circle of the holder together in such manner that when the holder carrying or carried by the chain or rope geared wheels, whether toothed or plain and fixed at intervals round the circle, moves upward or downward it will be sustained in the same relative position at all heights. The ring of gearing may be complete or partial or in sections, and the wheels may be arranged either tangentially, radially, or in any angle which may be desired, and the tank and holder may be and are, by preference, to insure easy working, fitted with rollers and plain guides, in addition to the gearing shown and described, without departing from the peculiar character of the invention.

Having now particularly described and ascertained the nature of my said invention and in what manner the same is to be performed, I declare that what I claim as my invention, and desire to secure by Letters Patent, is—

In a gas-holder, the wheels *c c*, attached at intervals round the gas-holder tank at or near the top and bottom thereof, combined with bands or chains passing over the wheels and attached to the holder at the points *e e*, forming a system of gearing which connects or gears together points upon and at intervals around such holder, so that one point moving upward or downward communicates through such gearing the tendency of motion to the other points round the holder, for the purpose and in manner substantially as herein set forth.

WILLIAM GADD.

Witnesses:
GEORGE FREDERICK GADD,
CHARLES LARGE.